(12) United States Patent
Kurihara et al.

(10) Patent No.: US 8,421,893 B2
(45) Date of Patent: Apr. 16, 2013

(54) SOLID-STATE IMAGING APPARATUS

(75) Inventors: Junichi Kurihara, Fukuoka (JP);
Naofumi Sakai, Fukuoka (JP)

(73) Assignee: Sony Corporation (JP)

( * ) Notice: Subject to any disclaimer, the term of this patent is extended or adjusted under 35 U.S.C. 154(b) by 132 days.

(21) Appl. No.: 13/162,741

(22) Filed: Jun. 17, 2011

(65) Prior Publication Data
US 2012/0008032 A1   Jan. 12, 2012

(30) Foreign Application Priority Data
Jun. 24, 2010   (JP) .................. 2010-143459

(51) Int. Cl.
H04N 5/335 (2006.01)
H04N 9/64 (2006.01)
H04N 5/217 (2011.01)

(52) U.S. Cl.
USPC .................. 348/308; 348/241; 348/243

(58) Field of Classification Search .......... 348/294–308, 348/241, 243, 248
See application file for complete search history.

(56) References Cited

U.S. PATENT DOCUMENTS

| | | | |
|---|---|---|---|
| 2006/0170803 A1* | 8/2006 | Lim | 348/308 |
| 2007/0080376 A1* | 4/2007 | Adachi et al. | 257/239 |
| 2008/0252767 A1 | 10/2008 | Muramatsu et al. | |
| 2009/0009635 A1 | 1/2009 | Maeda et al. | |

FOREIGN PATENT DOCUMENTS

| | | |
|---|---|---|
| JP | 2007-243266 | 9/2007 |
| JP | 2000-287131 | 10/2007 |
| JP | 2008-283557 | 11/2008 |

* cited by examiner

*Primary Examiner* — Tuan Ho
*Assistant Examiner* — Selam Gebriel
(74) *Attorney, Agent, or Firm* — Sheridan Ross P.C.

(57) ABSTRACT

A solid-state imaging apparatus includes a comparison section comparing a pixel signal from a pixel with a ramp signal and outputting a comparison signal. A measurement section starts counting in synchronism with the ramp signal and continues the counting until a signal supplied thereto reverses to measure comparison time. A comparator output controlling section interposed between the output of the comparison section and the input of the measurement section stops, if a pixel signal value exceeds a predetermined value determined based on a tanning phenomenon when the counting is started, the counting when the comparison signal is supplied to the measurement section to reverse the comparison signal, but supplies, if the pixel signal value does not exceed the predetermined value, a signal which is not reversed within a measurement period to the measurement section to continue the counting during the measurement period.

4 Claims, 10 Drawing Sheets

SOLID-STATE IMAGING APPARATUS

BACKGROUND

The present disclosure relates to a solid-state imaging apparatus.

As a solid-state imaging apparatus, a CCD (Charge Coupled Device) image sensor and a CMOS (Complementary Metal Oxide Semiconductor) image sensor are known. The solid-state imaging apparatuses just mentioned are widely used as an imaging device for a digital video camera, a digital still camera and a portable telephone set. In recent years, development of the CMOS image sensor whose power consumption is lower than that of the CCD image sensor has been advancing.

As the CMOS image sensor, an image sensor called column-parallel AD conversion type or column ADC (Analog-to-Digital Converter) type is available. The column ADC type image sensor includes a floating diffusion (FD) for each of pixels thereof, and selects one arbitrary row in the pixel array and accesses pixels for one row arranged in a column direction at the same time to read out pixel signals in parallel at the same time. Then, the read out pixel signals are AD converted, and digitalized image data for one column are outputted to a signal processing section.

As such an image sensor as described above, an image sensor is available in which difference processing between a signal level or reset level when the FD is reset and another signal level upon imaging is carried out to extract a pixel signal whose noise component is removed. This image sensor is preferable because a picture quality enhancement effect by noise removal is obtained in a general imaging condition.

Incidentally, it has turned out that, in a certain imaging condition, an adverse effect appears by carrying out such a difference process as described above. In particular, such an adverse effect as just described appears under an imaging condition of a greater light amount than a light amount at a saturation level such as a condition that there is a high luminance object such as the sun, a lamp or the like within an imaging range or the like. This adverse effect is called sunspot phenomenon or tanning phenomenon and is a phenomenon that a portion of a great light amount which is to be originally imaged as high-luminance white is imaged as a low-luminance portion or becomes black.

The phenomenon described above is caused from a phenomenon that, when very intense light is inputted to a charge generation section (photoelectric conversion device) of a pixel, charge generated by the charge generation section leaks out to the FD by capacity coupling and the reset level drops as time passes. Where the variation amount of the reset level is represented by $\Delta V$ and the signal level of a pixel signal corresponding to a signal charge amount acquired from the charge generation section is represented by Vb, Vb$-\Delta V$ is extracted as the pixel signal of the pixel by difference processing. In order to identify the extracted pixel signal from the pixel signal after the difference processing, a raw pixel signal acquired from a pixel is hereinafter referred to conveniently as "primitive pixel signal." If strong light is inputted to the charge generation section and the saturation level is reached, then the primitive pixel signal Vb is fixed without dropping from the reached level. On the other hand, the reset level drops to increase the variation amount $\Delta V$. Therefore, the difference Vb$-\Delta V$ decreases and the pixel signal to be outputted drops. As a result, a pixel signal drops although strong light is irradiated on a pixel, and as a result, a tanning phenomenon that a high-luminance object becomes a black image occurs.

In order to suppress occurrence of the tanning phenomenon, (1) a method is available in which the reset level is replaced into a predetermined value or the reset level is clipped (for example, refer to Japanese Patent Laid-Open No. 2000-287131). Further, (2) another method has been proposed in which control for an comparator output when a pixel signal level is read out is changed in response to a result of comparison between the reset level and a reference signal (for example, refer to Japanese Patent Laid-Open No. 2007-243266, hereinafter referred to as Patent Document 1). Further, (3) a method has been proposed in which an influence of dispersion of the reset level can be moderated upon decision of a tanning phenomenon (for example, refer to Japanese Patent Laid-Open No. 2008-283557, hereinafter referred to as Patent Document 2).

SUMMARY

However, such suppression methods for a tanning phenomenon as described above have subjects as described below.

(1) Method in which the Reset Level is Replaced into a Predetermined Value or is Clipped This method is a technique in which, where the reset level drops to such a degree that a tanning phenomenon appears, the reset level is replaced into a predetermined voltage or is clipped to a predetermined voltage before the reset level drastically drops thereby to prevent the tanning phenomenon.

However, where the configuration is applied in which the reset level is replaced into a predetermined voltage, a problem appears that it is obliged to provide a voltage generation section or a voltage replacement section in addition to a voltage detection section for detecting the reset level. This increases the scale of a circuit. On the other hand, where a configuration is applied in which the reset level is clipped to a predetermined voltage, a situation may occur that, from a characteristic dispersion of clip circuits disposed for columns, the predetermined voltage (clip level) differs among different columns. This situation leads to a state in which a criterion of tanning phenomenon occurrence differs among different columns, and leads to a subject that the degree of occurrence of the tanning phenomenon is dispersed among different columns.

(2) Method in which Control for a Comparator Output when a Pixel Signal Level is Read Out is Changed in Response to a Result of Comparison Between a Reset Level and a Reference Signal This method is a technique for avoiding the tanning phenomenon in a digital CDS (Correlated Double Sampling) process. Here, depending upon a result of comparison between the reset level and the reference signal (RAMP), control for a comparator output when a pixel signal (primitive pixel signal) after the comparison is read out is changed. In particular, in the case where the reset level is lower than the reference signal, the output of the comparator is fixed irrespective of the signal level of the primitive pixel signal within a period within which the primitive pixel signal is read out and full counting of a counter is carried out to prevent the tanning phenomenon. An outline of a manner of prevention of the tanning phenomenon is described with reference to a timing chart of FIG. 7. It is to be noted that a primitive pixel signal Vx in the case of a normal light amount obtained from a pixel is indicated by a solid line while the primitive pixel signal Vx in the case of a great light amount with which the tanning phenomenon appears is indicated by a broken line.

Referring to FIG. 7, a pixel is first selected by a signal SEL and charge of the FD of the pixel is reset by a signal RST. An auto zero process for adjusting references for a primitive pixel signal and a ramp signal Ramp to each other is carried out by a signal AZ. Then, a process for a P phase (pre-charge phase) for reading out the reset level and a process for a D phase (data phase) for reading out a signal level of the pixel are executed.

When the light amount is normal, the reset level is set by down counting the number of pulses of a clock CLK after a decreasing slope of the ramp signal Ramp in the P phase is started until the ramp signal Ramp and the primitive pixel signal Vx cross with each other to reverse the comparison output. The pixel signal is acquired by up counting the number of pulses of the clock CLK after the reduction slope of the ramp signal Ramp in the D phase is started until the ramp signal Ramp and the primitive pixel signal Vx cross with each other from the set value to reverse the comparison output. By combining the down counting of the reset level and the up counting of the primitive pixel signal in this manner, a pixel signal from which noise of the reset level is removed is obtained.

On the other hand, in the case of such a great light amount that a tanning phenomenon occurs, the primitive pixel signal Vx drops by a great amount as indicated by a broken line in FIG. 7 due to leakage of charge from time immediately after the charge of the FD is reset by the signal RST. Therefore, if the reset level is read out as it is, then the tanning phenomenon described above appears.

Therefore, in the case where the signal level, that is, the reset level, of the primitive pixel signal Vx read out from a pixel is lower than that of the ramp signal Ramp as indicated by a broken line in FIG. 7 within a period of the P phase within which the reset level is read out, a process described below is carried out. In particular, within a D phase period within which the primitive pixel signal is read out, an output of the comparator is fixed irrespective of the pixel signal level and the number of pulses of the clock CLK is fully counted within a period from a start of a decreasing slope of the ramp signal Ramp to an end of the decreasing slope. Consequently, an outputted pixel signal approaches a maximum value and the tanning phenomenon is prevented.

It is to be noted that, in the configuration illustrated in FIG. 7, a situation may occur that, in the case where very intense light is inputted, the primitive pixel signal drops to a lower limit within a period (referred to as AZ period) within which an auto zero process is carried out and the reset level becomes higher than the reference signal. In this regard, as indicated by a broken line in FIG. 8, a configuration is disclosed in Patent Document 1 in which, where the primitive pixel signal Vx drops by a great amount, the primitive pixel signal Vx is clamped by a signal CLP so that the reset level does not excessively drop across the RAMP amplitude of the reference signal.

However, such problems as described below may occur with the configuration described above. First, it is known that the following constraints are involved regarding the clamp level. In particular, (i) if the clamp level is raised, then although correction against the tanning phenomenon for a white region, that is, sunspot correction, becomes better, the dark characteristic, that is, the DK characteristic, of a black region degrades. (ii) On the other hand, if the clamp level is lowered, then while degradation of the DK characteristic does not occur, a tanning phenomenon becomes likely to appear. Where a dispersion of a semiconductor process is taken into consideration, also a case may appear in which no set value (Window) for the clamp level is involved as seen in FIG. 9. It is to be noted that columns in FIG. 9 individually indicate a threshold value voltage Vth of an amplification transistor of a pixel 11 and rows in FIG. 9 individually indicate a clamp level.

(3) Method of Making it Possible to Moderate the Influence of a Dispersion of the Reset Level Upon Decision of a Tanning Phenomenon This method is a technique for making it possible to moderate the influence of a dispersion of the reset level upon decision of a tanning phenomenon. In particular, a configuration is applied in which the decision level is adjusted in response to a pixel signal voltage upon resetting, that is, to a reset level, to set a suitable decision level for each of unit pixels.

In Patent Document 2, circuit configurations shown in FIGS. 10 and 11 are proposed as circuits for implementing the technique described above. In the circuits, a comparison section for comparing a reference signal having an initial value level and a decision level in a time series, and a pixel signal value is configured such that an input and an output of the comparison section are short-circuited to carry out initialization when the reference signal is equal to the initial value level.

However, the circuits have a subject that the number of components, that is, the number of devices, for configuring the circuits is great. Further, while a capacitor is connected to the gate of the NMOS input section in a comparison section 301 and another comparison section 401 as shown in FIG. 11, since the capacitors have a function for reducing a noise component, there is a subject that the size of the capacitors is generally great. As a result, there is a subject that the circuit area is increased by such a circuit configuration as described above.

Thus, it is desirable to provide a solid-state imaging apparatus in which correction against a tanning phenomenon can be carried out with a small-sized circuit configuration.

According to the present disclosure, there is provided a solid-state imaging apparatus including a pixel adapted to convert charge obtained by photo-electric conversion by a photoelectric conversion element into a pixel signal having a voltage corresponding to the charge amount and output the pixel signal, a comparison section (for example, a comparator 32 in an embodiment) adapted to compare the pixel signal outputted from the pixel with a ramp signal which varies with respect to time and output a comparison signal, a measurement section (for example, a counter 35 in the embodiment) adapted to start counting in synchronism with the ramp signal to continuously carry out the counting operation until a signal supplied to an input terminal thereof is reversed thereby to measure comparison time, and a comparator output controlling section (for example, a comparator output controlling circuit 33 in the embodiment) interposed between an output terminal of the comparison section and the input terminal of the measurement section and adapted to receive the pixel signal as an input thereto, the comparator output controlling section being operable, if a value of the pixel signal exceeds a predetermined value determined based on a tanning phenomenon when the counting is started by the measurement section, to stop the counting operation when the comparison signal outputted from the comparison section is supplied to the input terminal of the measurement section to reverse the comparison signal, but operable, if the value of the pixel signal is equal to or less than the predetermined value when the counting is started by the measurement section, to supply a signal (for example, a signal of the H level in the embodiment) which is not reversed within a measurement period by the measurement section to the input terminal of the measurement section to continue the counting operation during the measurement period.

Preferably, the predetermined value is determined based on a voltage of a reference signal set based on a saturation level of the pixel.

In this instance, preferably the comparator output controlling section includes a latch circuit configured by connecting two inverters in a loop and a NAND (Not AND) circuit connected at one of input terminals thereof to a first node of the latch circuit and at the other one of the input terminals thereof to the output terminal of the comparison section, a signal line for the pixel signal being connected to the first node while a signal line for the reference signal is connected to a second node of the latch circuit, the NAND circuit being connected at an output terminal thereof to the input terminal of the measurement section.

Preferably, a plurality of such pixels are arrayed in rows and columns to form a pixel array, the comparison section, measurement section and comparator output controlling section are provided for each of the columns of the pixels to form a conversion section, and only a data phase is provided within a column scanning period within which the pixels in each of the rows of the pixel array are operated in parallel without providing a pre-charge phase.

With the solid-state imaging apparatus, a tanning phenomenon can be suppressed by the comparator output controlling section provided between the comparison section and the measurement section. Accordingly, the solid-state imaging apparatus can carry out correction against a tanning phenomenon with a small-sized circuit configuration.

DETAILED DESCRIPTION OF THE PREFERRED EMBODIMENT

Figure 1:
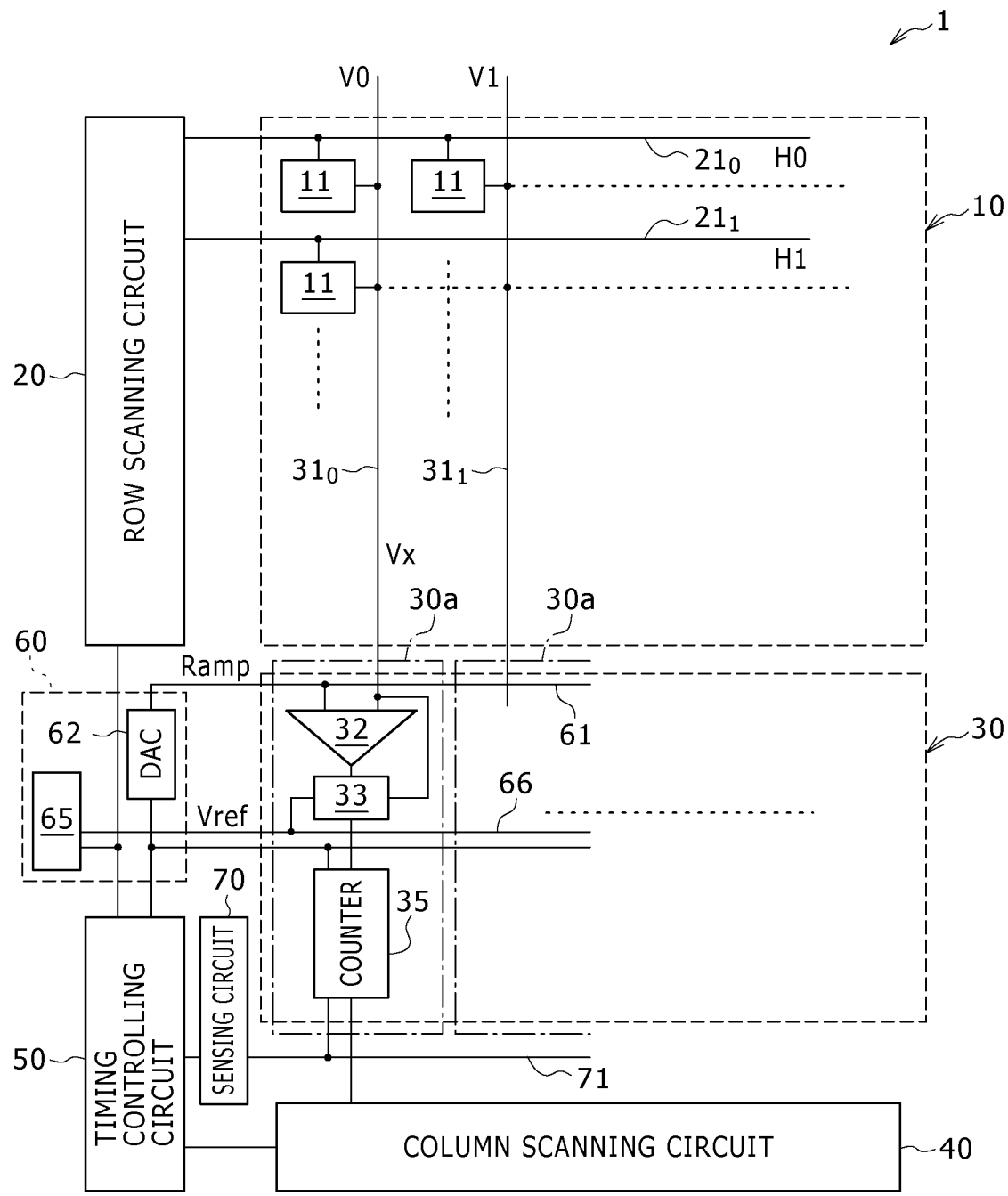
FIG. 1 is a block diagram of a CMOS image sensor showing a solid-state imaging apparatus according to the present disclosure as an example.

In the following, an embodiment for carrying out the present disclosure is described with reference to the drawings. FIG. 1 is a block diagram of a column ADC type CMOS image sensor in which a column-parallel analog/digital conversion section is incorporated, showing an example of a solid-state imaging apparatus according to the present disclosure. First, a general configuration of the solid-state imaging apparatus 1 is described with reference to FIG. 1.

1. General Configuration of the Solid-State Imaging Apparatus

The solid-state imaging apparatus 1 includes a pixel array 10, a row scanning circuit 20, a conversion section group 30, a column scanning circuit 40, a timing controlling circuit 50, a reference signal generation circuit 60, a sensing circuit 70 and so forth.

The pixel array 10 is configured by disposing a plurality of pixels 11, which individually include a charge generation section by photoelectric conversion, in a matrix along a plurality of rows H and columns V and forms a two-dimensional planar imaging section configured from a great number of pixels 11. It is to be noted that a configuration of the pixel or unit pixel 11 is hereinafter described in detail.

The row scanning circuit 20 is connected to the pixels 11 which configure the pixel array 10 through column signal lines 21 ($21_0$, $21_1$, . . . ) and controls designation of a column address Hn (H0, H1, . . . ) and column scanning based on a scanning signal outputted from the timing controlling circuit 50. A column signal line 21 is sometimes referred to as horizontal signal line and the row scanning circuit 20 is sometimes referred to as vertical scanning circuit.

The column scanning circuit 40 is connected to the pixels 11, which configure the pixel array 10, through column signal lines 31 ($31_0$, $31_1$, . . . ) and conversion sections 30a provided on the column signal lines. The column scanning circuit 40 controls designation of a column address Vn (V0, V1, . . . ) and column scanning based on a scanning signal outputted from the timing controlling circuit 50. A column signal line 31 is sometimes referred to as vertical signal line and the column scanning circuit 40 is sometimes referred to as horizontal scanning circuit.

The conversion section group 30 includes a plurality of conversion sections 30a provided corresponding to a plurality of pixel columns of the pixel array 10. Taking an imaging condition into consideration, each of the conversion sections 30a converts a pixel signal (primitive pixel signal) outputted from the pixel 11 into a digital signal corresponding to a signal level and outputs the converted signal. In particular, the conversion section group 30 configures a pixel signal conversion section of the column-parallel analog/digital conversion type or column ADC type. While a particular configuration of the conversion sections 30a is hereinafter described in detail, each of the conversion sections 30a converts an analog signal outputted from each pixel 11 into a digital signal by integration type AD conversion ready for APGA and digital CDS using a ramp signal Ramp and then outputs the converted signal.

The timing controlling circuit 50 controls working of the row scanning circuit 20, conversion section group 30 and column scanning circuit 40 to cause the components 20, 30 and 40 to output digital pixel signals read out from the pixel array 10 and AD-converted by the conversion section group 30 through a horizontal output line 71 including the sensing circuit 70.

Now, a configuration of the pixels 11 provided in the pixel array 10 and the conversion sections 30a provided in the conversion section group 30 in the solid-state imaging apparatus 1 configured in such a manner as described above are described.

2. Configuration of a Pixel

Figure 2:
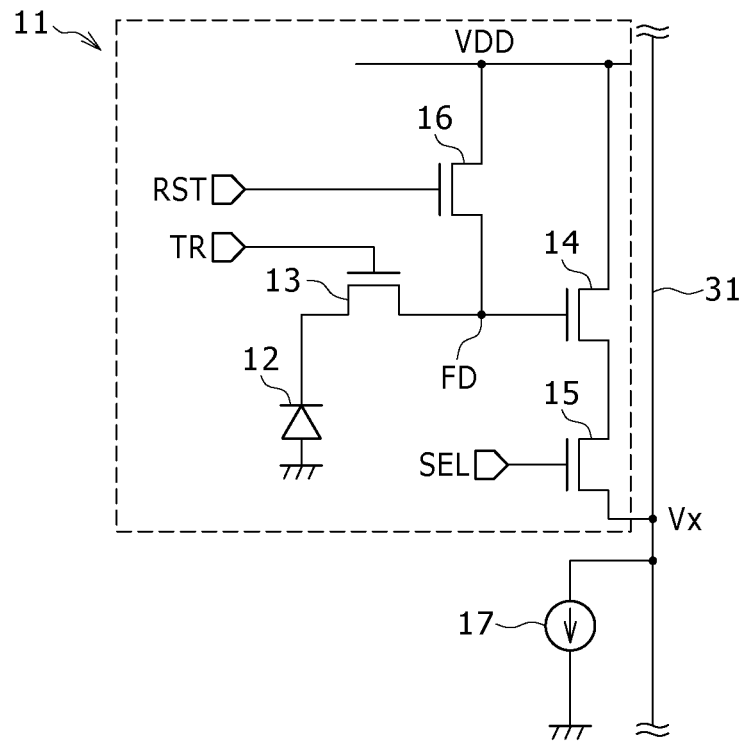
FIG. 2 is a block diagram illustrating a representative configuration of a pixel.

A representative example of a configuration of a pixel or unit pixel 11 is shown in FIG. 2. Referring to FIG. 2, the pixel 11 is a four-transistor type pixel configured from a photoelectric conversion device and four transistors.

In particular, the pixel 11 includes a photodiode 12 as the photoelectric conversion device and four transistors including a transfer transistor 13, an amplification transistor 14, a selection transistor 15 and a reset transistor 16 as active devices. The transistors are controlled by the row scanning circuit 20.

The photodiode 12 carries out photoelectric conversion into charge in response to a light amount of incident light. The transfer transistor 13 is connected between the photodiode 12 and a floating diffusion layer (Floating Diffusion) FD and transfers the charge of the photodiode 12 to the floating diffusion FD. By applying a transfer signal TR from the row scanning circuit 20 to the gate of the transfer transistor 13 through a transfer controlling line, the charge photo-electrically converted by the photodiode 12 is transferred to the floating diffusion FD.

The amplification transistor 14 is connected at the gate thereof to the floating diffusion FD. The amplification transistor 14 is connected to the column signal line 31 through the selection transistor 15 and configures a source follower together with a constant current source 17 provided outside the pixel 11. If a selection signal SEL is applied to the gate of the selection transistor 15 through a selection controlling line to turn on the selection transistor 15, then the amplification transistor 14 amplifies the potential of the floating diffusion FD and outputs a voltage corresponding to the potential to the column signal line 31. A signal voltage outputted from each of the pixels 11 is outputted to the conversion section 30a of the corresponding column through the column signal line 31.

The reset transistor 16 is connected between a power supply line VDD and the floating diffusion FD. By applying a reset signal RST from the row scanning circuit 20 to the gate of the reset transistor 16 through a reset controlling line in a read column for reading out a signal from the pixel, the potential of the floating diffusion FD is set to a reset level.

More particularly, in a state in which the transfer transistor 13 is off, the reset transistor 16 is turned on to introduce a reference potential from the power supply line VDD, and thereafter, the reset transistor 16 is turned off. Consequently, the floating diffusion FD is placed into a substantially fixed voltage of the reset level based on the reference potential upon operation with a normal light amount with which no tanning phenomenon occurs. Then, the voltage of the floating diffusion FD at this time is outputted to the column signal line 31 through the amplification transistor 14 and the selection transistor 15. Since the output is a signal upon resetting of the pixel 11, that is, a pixel signal of the reset level, and is an output within a P phase period within which the floating diffusion FD is pre-charged, the output is referred to sometime as P phase output.

Then, after the transfer transistor 13 is turned off within the P phase period, the photo-electrically converted charge is accumulated by the photodiode 12. Therefore, the transfer transistor 13 is turned on to transfer the charge accumulated in the photodiode 12 to the floating diffusion FD. At this time, if the floating diffusion FD has the potential of the reset level, then the floating diffusion FD is adjusted to a voltage to which a potential corresponding to a reception light amount further drops from the reset level. Then, the voltage of the floating diffusion FD at this time is outputted to the column signal line 31 through the amplification transistor 14 and the selection transistor 15. Since the output is a primitive pixel signal upon imaging of a pixel 11 and is an output within a D phase period within which image data is acquired, the output is referred to sometime as D phase output.

Then, by using a difference between the D phase output and the P phase output as a pixel signal, not only a dispersion of a DC component of outputs of the pixels 11 but also floating diffusion FD reset noise can be removed from the image signal. Since, for example, the transfer transistor 13, selection transistor 15 and reset transistor 16 are connected at the gates thereof to each other in a unit of a row, the operations described above are carried out at the same time for the pixels 11 of one row. The process for determining the difference between the D phase output and the P phase output as the pixel signal is executed by the conversion section 30a.

It is to be noted that, while the configuration in which an N channel transistor is applied to all of the transistors is illustrated in FIG. 2, if a P channel transistor is applied to some or all of the transistors, then a configuration similar to that described above can be implemented. Alternatively, a configuration in which the transfer transistor 13 is not provided, another configuration in which the selection transistor 15 is eliminated and selection control is carried out by the entire power supply, a further configuration in which an arbitrary component is shared by a plurality of pixels or the like may be applied.

3. Configuration of the Conversion Section

Referring back to FIG. 1, the conversion section 30a includes a comparator 32, a comparator output controlling circuit 33 and a counter 35 and has an n-bit (n is a natural number) digital signal conversion function.

The comparator 32 serves as a comparison section which compares a primitive pixel signal Vx outputted from a pixel 11 and a ramp signal Ramp outputted from a ramp signal generation circuit 62 of the reference signal generation circuit 60 with each other and reverses an output thereof when the relationship in magnitude of the compared signals turns over. The ramp signal Ramp is a signal of a slope waveform which varies linearly with a predetermined gradient with respect to time and is generated by the ramp signal generation circuit 62 and inputted to the comparator 32 through a ramp signal line 61.

The comparator output controlling circuit 33 controls an output of the comparator 32 inputted to the counter 35 to carry out tanning correction based on the primitive pixel signal Vx outputted from the pixel 11 and a reference signal Vref outputted from a Vref generation circuit 65 of the reference signal generation circuit 60.

The counter 35 AD converts an analog primitive pixel signal supplied thereto from a pixel 11 through the comparator 32 and the comparator output controlling circuit 33 based on the primitive pixel signal or the tanning correction signal and the ramp signal Ramp, and outputs a resulting pixel signal. Although this operation is hereinafter described in detail, basically, that is, in an ordinary light amount state, the period of time until the magnitude relationship between the primitive pixel signal Vx and the ramp signal Ramp turns over is converted into a digital value by counting the number of clock pulses outputted from the timing controlling circuit 50. In other words, the counter 35 configures an AD conversion section for converting an analog primitive pixel signal into a digital pixel signal.

It is to be noted that the counter 35 may be formed from two separate counter sections in order to arithmetically operate results of twice of reading out for the P phase and the D phase. However, if a bidirectional counter is used as the counter 35, the configuration of the conversion section 30a can be simplified. The following description is given in regard to a form wherein a bidirectional counter is used for the counter 35.

Further, it is a preferable configuration form to provide a memory section such as, for example, latch circuits for n bits for retaining a count value for comparison time counted by the counter 35. According to the configuration just described, concurrent operation of comparison and counting by and outputting of a count value from the comparator 32 can be carried out, and consequently, high-speed concurrent operation is permitted. A horizontal outputting line for outputting the count value is configured from horizontal output lines 71 and sensing circuits 70 of an n-bit width. While, in the present embodiment, the number of such horizontal output lines 71 and horizontal output lines 70 is n, it is possible to increase the number to n×m (m is a natural number) so that they are arranged in parallel to raise the outputting speed.

4. Configuration of the Comparator

Figure 3:
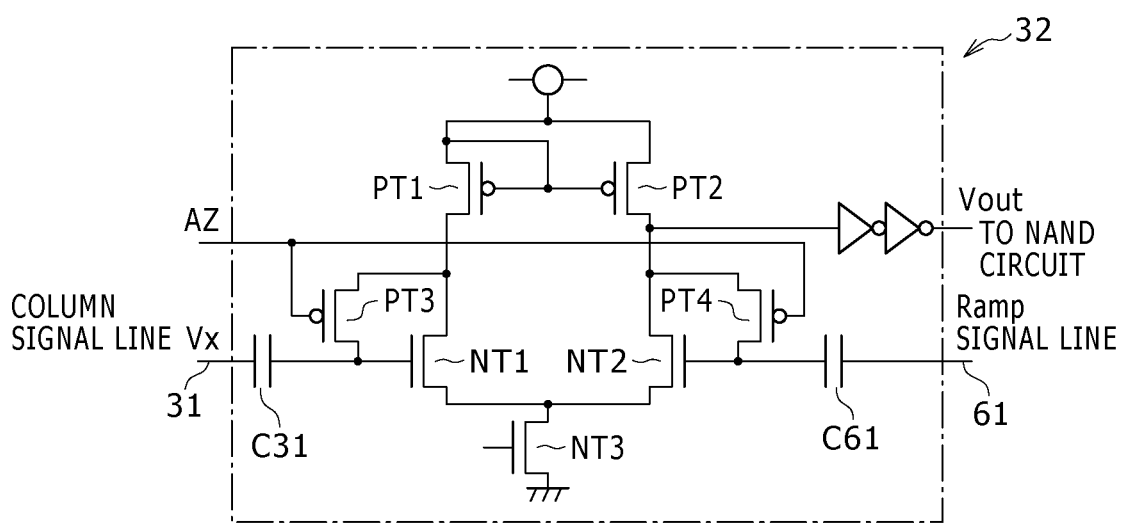
FIG. 3 is a block diagram illustrating a circuit configuration of a comparator.

Now, a detailed configuration of the comparator 32 is described. An example of a circuit configuration of the comparator 32 is shown in FIG. 3. Referring to FIG. 3, the comparator 32 includes PMOS transistors PT1 to PT4, NMOS transistors NT1 to NT3, and a first capacitor C31 and a second capacitor C61 as sampling capacitors of an auto zero (Auto Zero: AZ) level.

The comparator 32 is a differential amplifier, and a current mirror circuit is configured from the PMOS transistors PT1 and PT2 while a differential comparison section in which the NMOS transistor NT3 is used as a current source is configured from the NMOS transistors NT1 and NT2. In particular, in the comparison section, a primitive pixel signal Vx inputted from a pixel 11 through a column signal line 31 and a ramp signal Ramp inputted through a ramp signal line 61 are compared with each other, and a signal having a voltage according to a result of the comparison is outputted. The output of the comparison section is inversed by twice by a double-stage inverter and is outputted as a comparison signal Vout to the comparator output controlling circuit 33.

The PMOS transistor PT3 functions as a switching transistor and is connected between the gate and the drain of the NMOS transistor NT1. Also the PMOS transistor PT4 functions as a switching transistor and is connected between the gate and the drain of the NMOS transistor NT2.

The primitive pixel signal Vx is inputted to the gate of the NMOS transistor NT1 through the first capacitor C31 and the ramp signal Ramp is inputted to the gate of the NMOS transistor NT2 through the second capacitor C61. The first capacitor C31 is connected as a capacitor for cutting a DC level at the gate of the NMOS transistor NT1, and the second capacitor C61 is connected as a capacitor for cutting a DC level at the gate of the NMOS transistor NT2.

The comparator 32 is a circuit whose comparison signal Vout exhibits an H (High) level or an L (Low) level depending upon a relationship in magnitude of the voltage levels of the ramp signal Ramp and the primitive pixel signal Vx. The comparator 32 first determines a criterion voltage for comparison. Thus, a process for determining the voltage is hereinafter referred to as auto zero process. When the auto zero process is carried out, the reset level of the column signal line 31 is inputted to the primitive pixel signal Vx side and a criterion reference voltage is inputted to the ramp signal Ramp side.

An AZ signal for commonly carrying out the auto zero process is supplied to the gates of the PMOS transistors PT3 and PT4. The auto zero process is executed before outputting for the P phase from a pixel 11 and particularly executed in response to a falling edge and a rising edge of the AZ signal. First, the PMOS transistors PT3 and PT4 are turned on to place the comparator 32 into an auto zero state at a falling edge timing of the AZ signal. An operating point is determined at a timing at which the gate voltages of the NMOS transistor NT1 and NT2 become equal to each other and the circuit is equilibrated.

Then, the PMOS transistors PT3 and PT4 are switched off to place the gates of the NMOS transistors NT1 and NT2 into a floating state at a rising edge timing of the AZ signal. At this time, a difference between the criterion reference voltage and the gate voltage of the NMOS transistor NT1 is retained into the first capacitor C31 and another difference between the voltage of the reset level of the column signal line 31 and the gate voltage of the NMOS transistor NT2 is retained into the second capacitor C61. After such an auto zero process as described above is carried out, the zero levels of the primitive pixel signal Vx and the ramp signal Ramp are equal to each other and are placed in a state in which they can be compared in magnitude with each other.

The through rate of the comparator 32 is improved as the rising edge of the AZ signal becomes gentle. Therefore, by making the rising edge of the AZ signal gentle, the reset level of the pixel 11 can be improved against dispersion.

It is to be noted that the inputting transistor can be configured similarly as a P-channel transistor depending upon the input value. Further, the differential amplifier can be configured in a leftwardly and rightward reversed relationship to that described hereinabove including the output thereof.

5. Configuration of the Comparator Output Controlling Circuit

Figure 4:
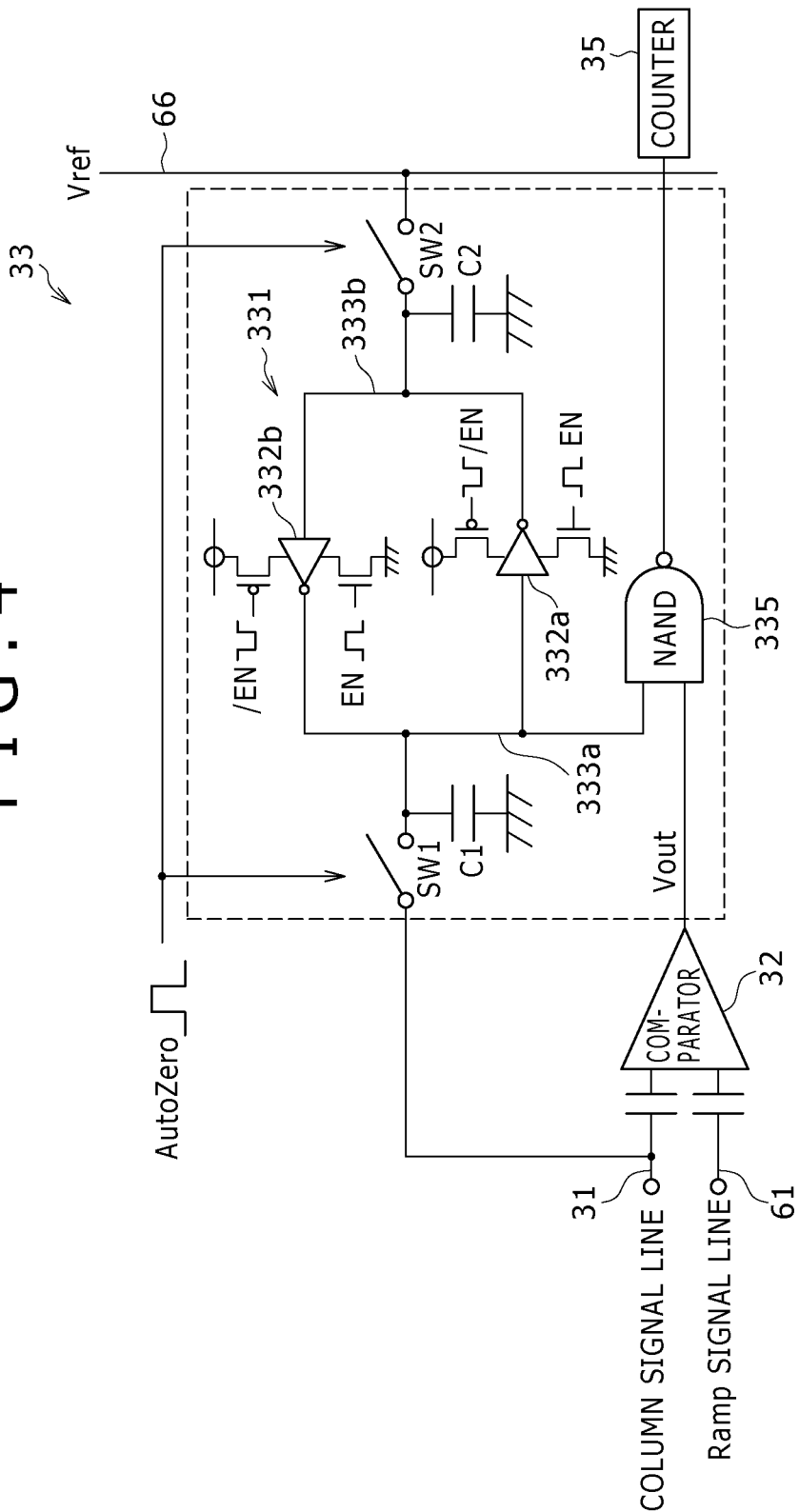
FIG. 4 is a block diagram illustrating a circuit configuration of a comparator output controlling circuit.

Now, a detailed configuration of the comparator output controlling circuit 33 is described. An example of a circuit configuration of the comparator output controlling circuit 33 is shown in FIG. 4. Referring to FIG. 4, the comparator output controlling circuit 33 includes a latch circuit 331 in which two inverters 332a and 332b are connected to each other into a loop and a NAND circuit 335 connected to a node 333a of the latch circuit 331.

The column signal line 31 is connected to the node 333a of the latch circuit 331 on the side on which the NAND circuit 335 is connected through a capacitor C1 and a switch SW1, and a Vref signal line 66 of the Vref generation circuit 65 is connected to the other node 333b of the latch circuit 331 through a capacitor C2 and a switch SW2. The switches SW1 and SW2 are switched on/off by the AZ signal described hereinabove. Further, the two inverters of the latch circuit 331 are switched on/off by an enable switch driven by an activation signal EN.

Therefore, if the AZ signal is placed into the H level and the switches SW1 and SW2 are switched on, then the potential of the column signal line 31, that is, the voltage Vx of a primitive pixel signal, is retained into the capacitor C1 and the potential of the Vref signal line 66, that is, the voltage of the reference signal Vref, is retained into the capacitor C2. It is to be noted that, at this time, the EN signal has the L level and the enable switch of the latch circuit 331 is placed in an off state.

The other one of input terminals of the NAND circuit 335 is connected to the output of the comparator 32 and an output terminal of the NAND circuit 335 is connected to the counter 35. In particular, the NAND circuit 335 receives the output of the latch circuit 331 and the output of the comparator 32 as inputs thereto, and a NAND value of the outputs is outputted to the counter 35. Therefore, the input signal of the counter 35 is changed over between the H level and the L level in response to the voltage of the comparison signal Vout outputted from the comparator 32 and the voltage of the node 333a of the latch circuit 331. Then, operation of the counter 35 is controlled by the output signal outputted from the comparator output controlling circuit 33, particularly the NAND circuit 335. Operation of the solid-state imaging apparatus 1 configured in such a manner as described above, that is, working of the conversion section 30a, is described below.

6. Operation of the Solid-State Imaging Apparatus (1) First Control Mode

Figure 5:
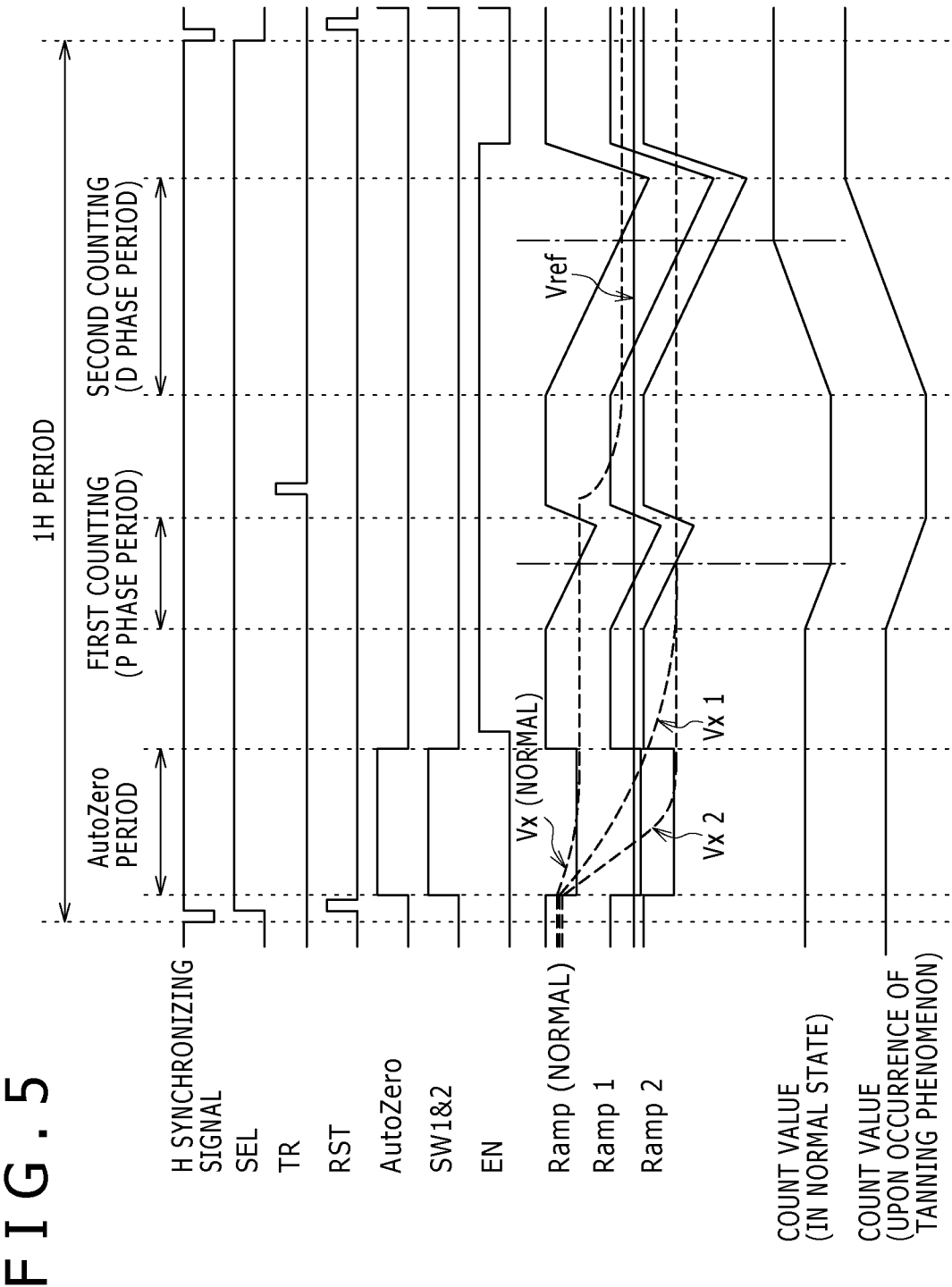
FIG. 5 is a timing chart illustrating an operation situation of the solid-state imaging apparatus in a first control mode.

A timing chart which represents an operation situation of the solid-state imaging apparatus in the first control mode is illustrated in FIG. 5. In the timing chart, time series variation within 1H (1 horizontal) period such as the selection signal SEL, transfer signal TR, reset signal RST, AZ signal, on/off signals for the switches SW1 and SW2 in the comparator output controlling circuit and the inverters are illustrated at the upper stage. Further, time series variation of the ramp signal Ramp and time series variation of a count value by the counter 35 are illustrated when the light amount is normal and when the tanning phenomenon occurs at the lower stage in FIG. 5.

First, after first time readout of the columns from the pixels 11 of an arbitrary row address Hn (H0, H1, . . . ) is stabilized, the pixels 11 are reset by the reset signal RST. Then, the pixels 11 are initialized by the signal level of the column signal line 31, that is, by the voltage level of the primitive pixel signal Vx, when an operating point of the comparator 32 is activated by the AZ (Auto Zero) signal and the signal level of the ramp signal line 61, which is the voltage level of the ramp signal Ramp.

In particular, initialization is carried out when the pixels 11 are placed in the reset level, and then the zero points of the signal level of the primitive pixel signal Vx in the reset state read out from the pixel 11 through the column signal line 31 and the signal level of the initial value of the ramp signal Ramp are adjusted to each other. In particular, in the circuit configuration of the comparator 32 shown in FIG. 3, a DC component is cut by the capacitors C31 and C61. Therefore, by carrying out auto zero operation for the result in which the DC component is cut for the signal Vx of the column signal line 31 and the signal Ramp of the ramp signal line 61, the potentials when the AZ signal is cut are retained into the first and second capacitors C31 and C61 and the zero points are adjusted under the condition just described.

Thereafter, in order to avoid initialization dispersion by the auto zero operation, a little offset is applied once by the ramp signal generation circuit 62 and then a slope-waveform ramp signal whose signal voltage or ramp signal line level is varied with respect to time is inputted to the comparator 32. Then, comparison between the voltage of the pixel signal Vx of the reset level read out from the column signal line 31 and the voltage of the ramp signal Ramp which varies in a slope is carried out by the comparator 32, and first time counting (P phase) is carried out.

At this time, the counter 35 starts counting at the same time with starting of a decreasing slope of the ramp signal Ramp, and the ramp signal Ramp and the count value vary in a one-on-one corresponding relationship with each other in time so that a read out analog signal in a reset state is converted into a digital signal. In particular, the ramp signal Ramp is used for conversion from variation of the voltage into variation of time, and this time, that is, the number of pulses of the clock pulse, is converted into a digital value by counting the same by the counter 35.

Then, the output of the comparator 32 is reversed when the primitive pixel signal Vx and the ramp signal Ramp cross with each other, and, in the case of normal operation wherein a tanning phenomenon does not occur, a count value corresponding to a comparison period is retained into the counter at the same time with the reversal.

In the first time readout, after the selection transistor 15 of the pixel 11 is switched on by the selection signal SEL, the reset transistor 16 is switched on by the reset signal RST to reset the floating diffusion FD and read out the reset level.

Here, noise which disperses among the unit pixels is included as an offset in the reset level or reset component. However, since the dispersion of the reset level is generally small and the value of the reset level is common to all of the pixels, an arbitrary column signal line is known roughly. Further, by activation of the AZ signal, the operating point of the comparator 32 is initialized already by the signal level of the column signal line 31 and the signal level of the ramp signal line 61 at this time. Accordingly, upon the readout of the reset level, the comparison period can be drastically reduced by adjusting the ramp signal. In the present embodiment, comparison with the reset level is carried out within a counting period for 8 bits, that is, for 256 clocks.

It is to be noted that, in the comparator output controlling circuit 33, the switches SW1 and SW2 are switched on so that the column signal line 31 and the Vref signal line 66 are connected to the nodes 333a and 333b of the latch circuit 331 within the AZ period, respectively. If the AZ period ends, then the enable switch is switched on by the activation signal EN to activate the latch circuit 331 thereby to amplify the potential difference between the nodes 333a and 333b to the power supply voltage level. Then, the amplified potential difference is outputted to the input terminal of the NAND circuit 335. The activation of the latch circuit 331 is maintained until a second time readout period, which is a D phase period, comes to an end.

Here, the reference signal Vref to be outputted to the comparator output controlling circuit 33 through the Vref signal line 66 is produced by the Vref generation circuit 65. The voltage of the reference signal Vref is set equal to the voltage of the pixel signal Vx when a tanning phenomenon occurs or a tanning phenomenon is recognized or set to a voltage level higher by 10 and several mV taking the dispersion of the column signal line 31 into consideration. In other words, the voltage of the pixel signal Vref is set equal to or higher by a little than the signal voltage of the pixel signal which is outputted in a state in which the incident light amount reaches the saturation level of the photodiode 12. Therefore, in the case of the normal operation in which a tanning phenomenon does not occur, the potential difference between the pixel signal Vx and the reference signal Vref upon starting of measurement is great, and the signal of the H level which is amplified to the power supply voltage is inputted from the node 333a of the latch circuit 331 to the NAND circuit 335.

In the second time readout, the transfer transistor 13 is switched on by the transfer signal TR while the selection transistor 15 is maintained in an on state by the selection signal SEL. Further, a pixel signal which includes a signal component corresponding to the incident light amount in addition to a reset component is read out. The second time readout is a D phase period within which a pixel signal or primitive pixel signal upon image picking up is read out from the pixel 11 to acquire image data.

The primitive pixel signal Vx read out through the column signal line 31 and the ramp signal Ramp are compared by the comparator 32. In the case of the normal operation in which a tanning phenomenon does not occur, the output of the comparator 32 is reversed when the primitive pixel signal Vx and the ramp signal Ramp cross with each other and, in the case of the normal operation in which a tanning phenomenon does not occur, the count value corresponding to a comparison period is retained into the counter at the same time with the inversion.

In particular, before the primitive pixel signal Vx and the ramp signal Ramp cross with each other, the primitive pixel signal Vx is lower in voltage than the ramp signal Ramp. On the other hand, after the primitive pixel signal Vx and the ramp signal Ramp cross with each other, the primitive pixel signal Vx is higher in voltage than the ramp signal Ramp. As a result, the voltage level of the comparison signal Vout outputted from the comparator 32 to the NAND circuit 335 changes over from L to H. Meanwhile, in the comparator output controlling circuit 33, in the case of ordinary operation wherein no tanning phenomenon occurs, the potential difference between the primitive pixel signal Vx and the reference signal Vref upon starting of measurement is great, and the signal outputted from the node 333a of the latch circuit 331 to the NAND circuit 335 is held at the H level. Therefore, the signal outputted from the NAND circuit 335 to the counter reverses from the H level to the L level, and a count value corresponding to the comparison period is held simultaneously with the reversal.

Here, if the first time counting is down counting and the second time counting is up counting, then the second time count value−first time count value is automatically held by the counter. Since, upon second time reading out, it is important to carry out counting over a wide range corresponding to the dynamic range, in the present embodiment, comparison of the signal component+reset level is carried out in a counting period for 10 bits+8 bits, that is, for 1,280 clocks.

In an ordinary case in which no tanning phenomenon occurs, the reset level is stabilized at an early stage (refer to Vx (normal) indicated by a broken line in FIG. 5), and the signal level of the primitive pixel signal Vx becomes substantially fixed over a period from an auto zero period (AZ period) to a first time reading out period. Accordingly, appropriate operation is obtained by such difference processing by the bidirectional counter as described above. However, in such a case that such excessive light as significantly exceeds the saturation level of the photodiode 12 is inputted to the photodiode 12, then charge of the photodiode 12 sometimes leaks to the FD within the AZ period.

If this occurs, then such a situation occurs that the signal voltage of the primitive pixel signal Vx inputted through the column signal line 31 drops suddenly within the AZ period to the P phase period. For example, the signal voltage of the primitive pixel signal Vx sometimes becomes higher than the amplitude of the ramp signal Ramp within a P phase period with respect to the signal level after the auto zero process (Vx1 indicated by a broken line in FIG. 5) or sometimes drops fully within an AZ period (refer to Vx2 indicated by a broken line in FIG. 5).

In a configuration which does not include a section for preventing a tanning phenomenon, if the difference processing of the second time count value−first time count value is carried out, then since the difference between them is small, the output becomes a dark signal representative of the black or a color near to the black. Therefore, although the input light amount is great, a tanning phenomenon appears.

In the following, operation in the case where such extremely excessive incident as may cause a tanning phenomenon is inputted is described continuously with reference to FIG. 5.

If the voltage of the primitive pixel signal Vx is dropped by excessive incident light during an AZ period, then the dropped voltage of the primitive pixel signal Vx and the voltage of the reference signal Vref are retained into the capacitors C1 and C2 in the comparator output controlling circuit 33, respectively. When the AZ period comes to an end, the latch circuit 331 in the comparator output controlling circuit 33 is activated by an activation signal EN. The voltage of the node 333a of the latch circuit 331 corresponds to a potential difference between the potentials retained in the capacitors C1 and C2.

However, if the voltage of the primitive pixel signal Vx drops as described above until it becomes lower than the voltage of the reference signal Vref, then when the latch circuit 331 is activated, the voltage of the node 333a becomes equal to the GND level.

The node 333a of the latch circuit 331 is connected directly to the NAND circuit 335, and the output of the NAND circuit 335 exhibits the H (High) level irrespective of the voltage level of the comparison signal Vout of the comparator 32.

Since the latch circuit 331 remains in the activated state until the second time readout (D phase) comes to an end, also the output of the NAND circuit 335 continues to exhibit the H level within the period. After all, in the case where such extremely excessive incident light as may cause a tanning phenomenon is inputted, then the input signal to the counter 35 does not reverse upon both of the first time counting and the second time counting. In particular, the second time count value−first time count value exhibits a value obtained by full counting within a counting period for 10 bits prepared for reading out signal components, that is, within a period of 1,024 clocks.

In this manner, the present disclosure is characterized in that, against such a condition that the potential of the floating diffusion fluctuates by a great amount within a zero adjustment period of a ramp signal, a tanning phenomenon can be suppressed with a very simple configuration having a reduced number of components.

(2) Second Control Mode

Now, a second control mode of the present disclosure is described. In the present control mode, the counter 35 does not carry out counting in the P phase. Operation of the solid-state imaging apparatus 1 according to the present control mode is described with reference to a flow chart shown in FIG. 6. It is to be noted that signals in the timing chart are same as those in the first control code, and overlapping description of them is omitted herein to avoid redundancy.

Controlling operation within an auto zero period is similar to that in the first control mode. First, after reading out of columns from pixels 11 of an arbitrary row address Hn (H0, H1, . . . ) is stabilized, the pixels 11 are reset by the reset signal RST. Then, the operating point of the comparator 32 is initialized with the primitive pixel signal Vx of the column signal line 31 and the ramp signal Ramp of the ramp signal line 61 upon signal activation using an AZ signal.

In particular, when the pixel 11 has the reset level, initialization is carried out to adjust the primitive pixel signal Vx in the reset state read out from the pixel 11 through the column signal line 31 and the zero point of the initial value of the ramp signal Ramp to each other. In particular, zero point adjustment of the primitive pixel signal Vx of the column signal line 31 and the ramp signal Ramp of the ramp signal line 61 is carried out with the DC components thereof cut so that charge when the AZ signal is turned off is retained into the first and second capacitors C31 and C61, and under this condition, the zero points are adjusted to each other.

Thereafter, in order to avoid an initialization dispersion by the auto zero operation, a ramp signal of a slope waveform obtained by applying a very small offset once by the ramp signal generation circuit 62 and then varying the signal voltage with respect to time is inputted to the comparator 32. Then, while the selection transistor 15 is kept in an activated state by a selection signal SEL of the pixel 11, the transfer transistor 13 is activated by a transfer signal TR to read out a signal component corresponding to the incident light amount to the pixel 11 added to the reset level to the column signal line 31.

Then, comparison between the voltage of the primitive pixel signal Vx of the reset level read out from the column signal line 31 and the voltage of the ramp signal Ramp which exhibits a sloped variation is carried out by the comparator 32, and counting in the D phase is carried out. The counting is started simultaneously with a start of a decreasing slope of the ramp signal Ramp by the counter 35. Since the ramp signal Ramp and the count value vary in a one-by-one corresponding relationship in time, the read out primitive pixel signal Vx is converted into a digital signal.

In the present embodiment, since a very small offset is applied to the ramp signal line level by the ramp signal generation circuit 62 in advance, preferably the count value corresponding to the offset is subtracted from the counting result thereby to output a signal component corresponding to the incident light amount. This work is carried out generally by a logic circuit succeeding the sensing circuit 70. In the present embodiment, the work is carried out in the timing controlling circuit 50.

In the comparator output controlling circuit 33, the switches SW1 and SW2 exhibit an on state within the AZ period to connect the column signal line 31 and the Vref signal line 66 to the nodes 333a and 333b of the latch circuit 331, respectively. If the AZ period comes to an end, then the enable switch is turned on by the activation signal EN to activate the latch circuit 331 to amplify the potential difference between the nodes 333a and 333b to the power supply voltage level so that the amplified potential difference is outputted to the input terminal of the NAND circuit 335. The activation of the latch circuit 331 is maintained until after the readout period, that is, the D phase period, comes to an end.

The reference signal to be outputted to the Vref signal line 66 is generated by the Vref generation circuit 65. The voltage of the reference signal Vref is set to a voltage equal to the voltage of the primitive pixel signal Vx when a tanning phenomenon occurs or higher by approximate ten and several mV taking a dispersion of the column signal line 31 into consideration. In other words, the voltage of the reference signal Vref is set equal to or a little higher than the signal voltage of the pixel signal which is outputted in a state in which the incident light amount reaches the saturation level of the photodiode 12. Accordingly, in the case of ordinary operation in which no tanning phenomenon occurs, a signal amplified to the power supply voltage is inputted from the node 333a of the latch circuit 331 to the NAND circuit 335.

As described hereinabove, in the case of ordinary operation in which no tanning phenomenon occurs, when the ramp signal Ramp of the ramp signal line 61 and the primitive pixel signal Vx of the column signal line 31 become equal to each other, the output of the comparator 32 reverses, and simultaneously, a count value corresponding to the comparison period is retained into the counter 35. At this time, the counting is set to up counting. In the second control mode, comparison of signal components is carried out in a counting period for 10 bits, that is, for 1,024 clocks.

In an ordinary case in which no tanning phenomenon occurs, the reset level is stabilized at an early stage (refer to Vx (normal) indicated by a broken line in FIG. 5), and the signal level of the primitive pixel signal Vx is substantially fixed until a readout period is entered from the auto zero period. Accordingly, an appropriate process can be carried out with the count value of the bidirectional counter. However, in the case where such excessive incident light as significantly exceeds the saturation level is inputted to the photodiode 12, charge of the photodiode 12 sometimes leaks out to the FD from the AZ period.

Figure 6:
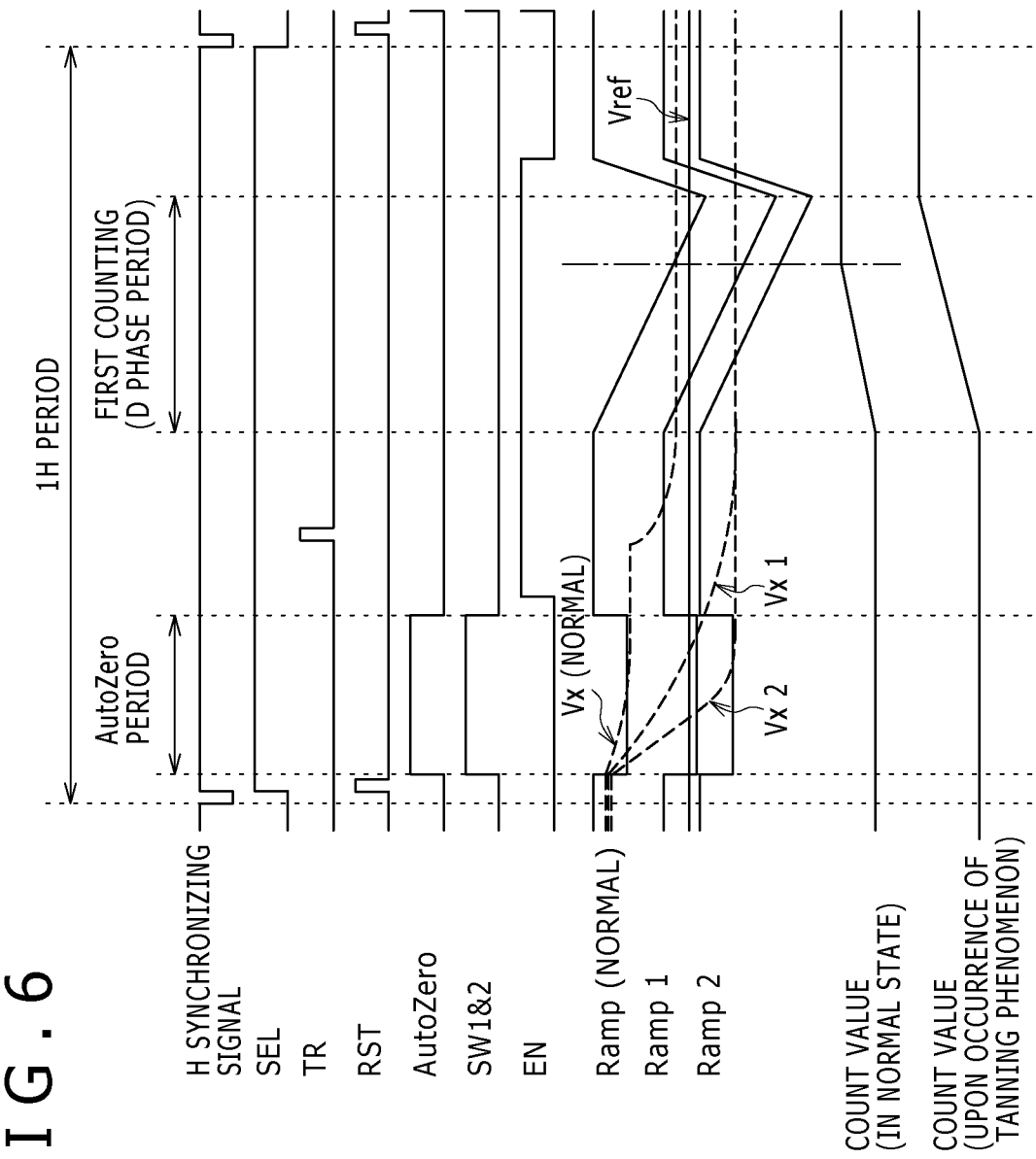
FIG. 6 is a timing chart illustrating an operation situation of the solid-state imaging apparatus in the first control mode.
Figure 7:
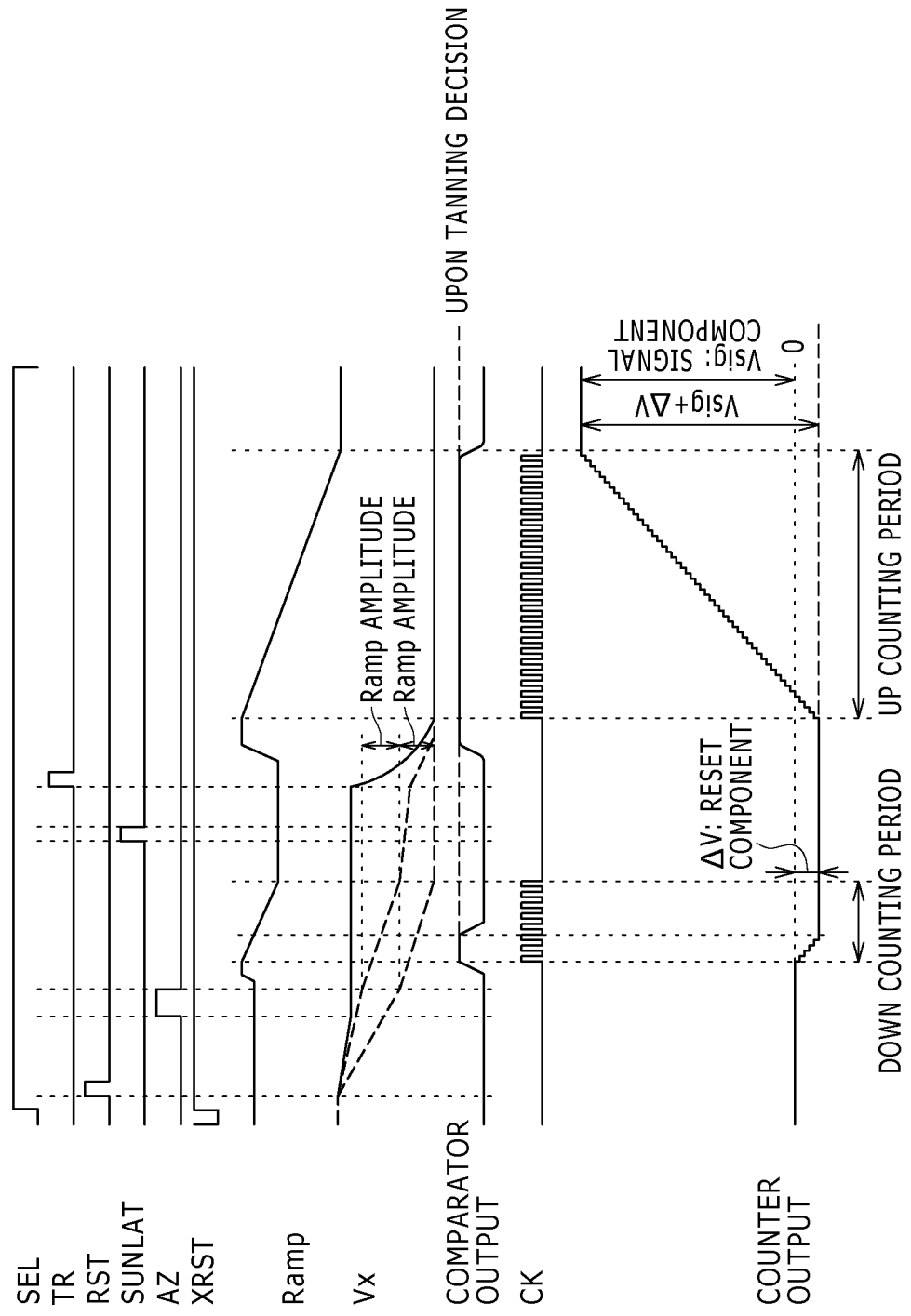
FIG. 7 is a timing chart illustrating an example of a controlling configuration in an existing solid-state imaging apparatus.
Figure 8:
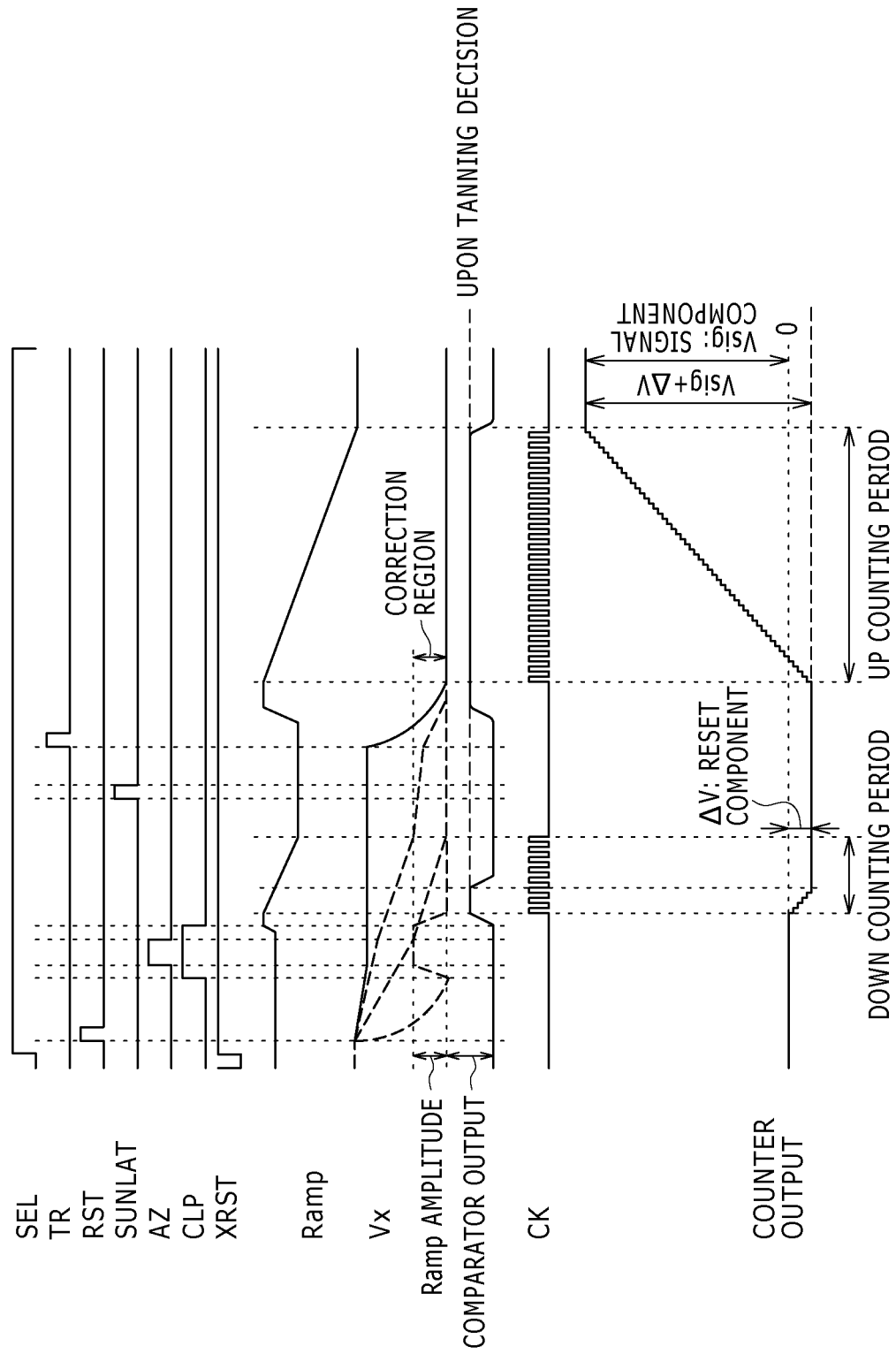
FIG. 8 is a timing chart illustrating another example of the controlling configuration in the existing solid-state imaging apparatus.
Figure 9:
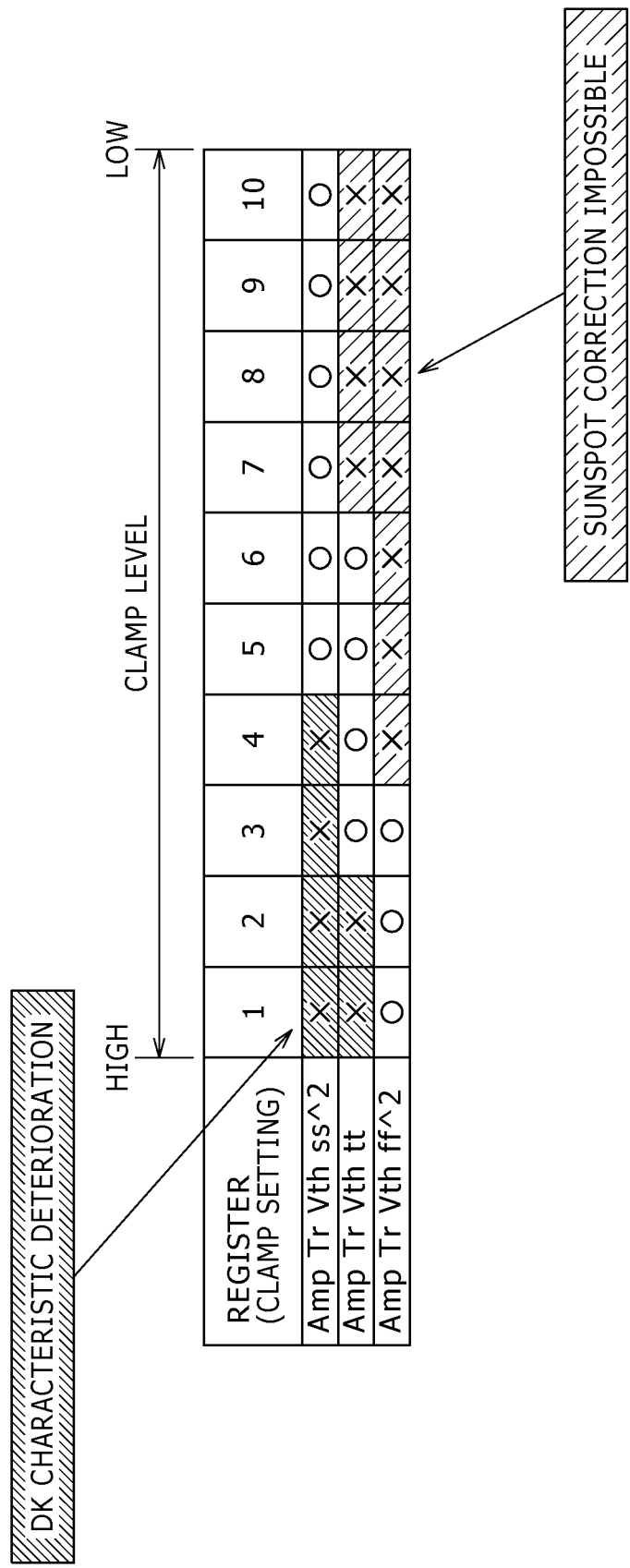
FIG. 9 is a table illustrating a relationship between correction against a tanning phenomenon and a dark characteristic or DK characteristic of a black region in the conventional solid-state imaging apparatus.
Figure 10:
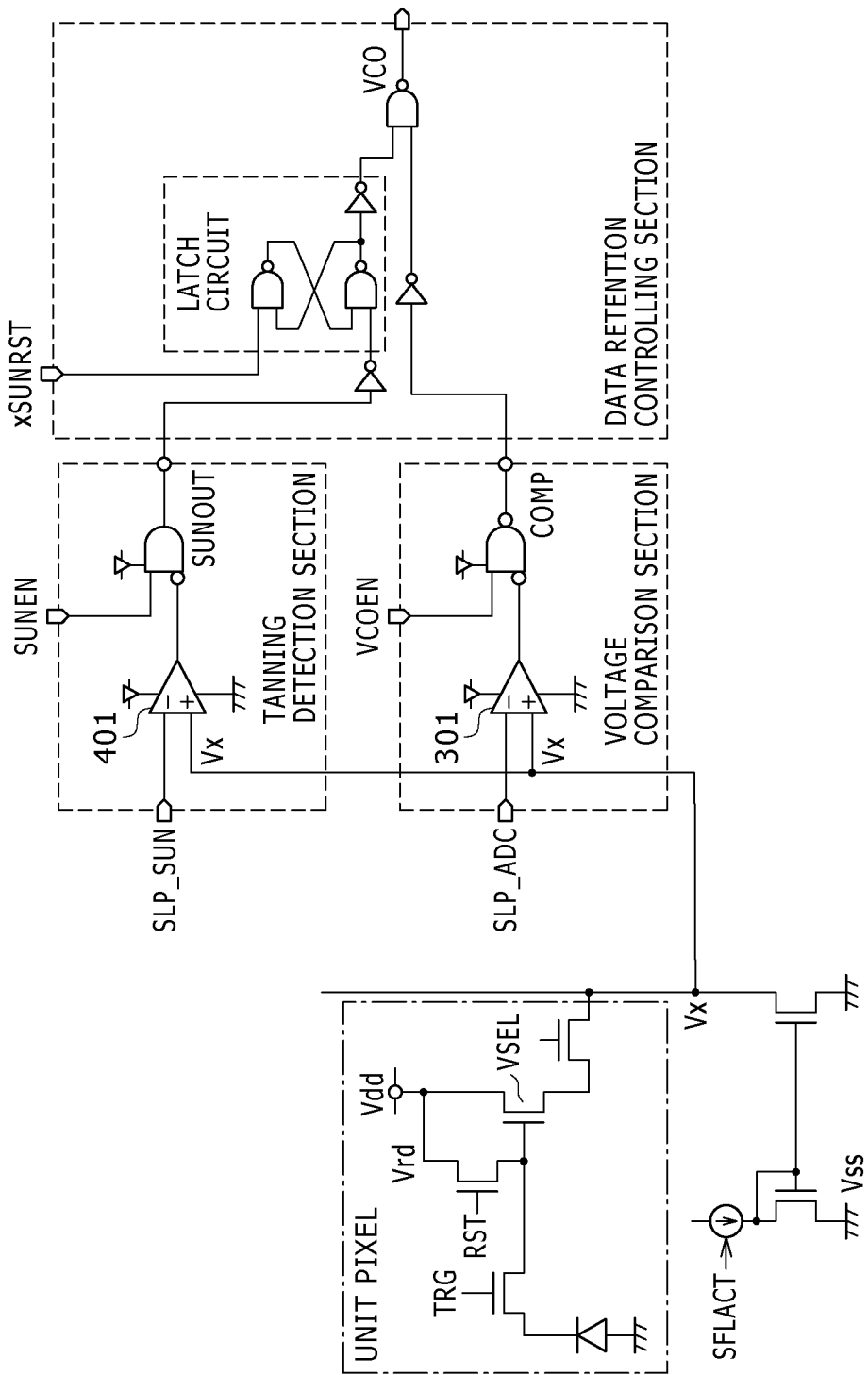
FIG. 10 is a block diagram of a circuit for tanning phenomenon decision in the conventional solid-state imaging apparatus.
Figure 11:
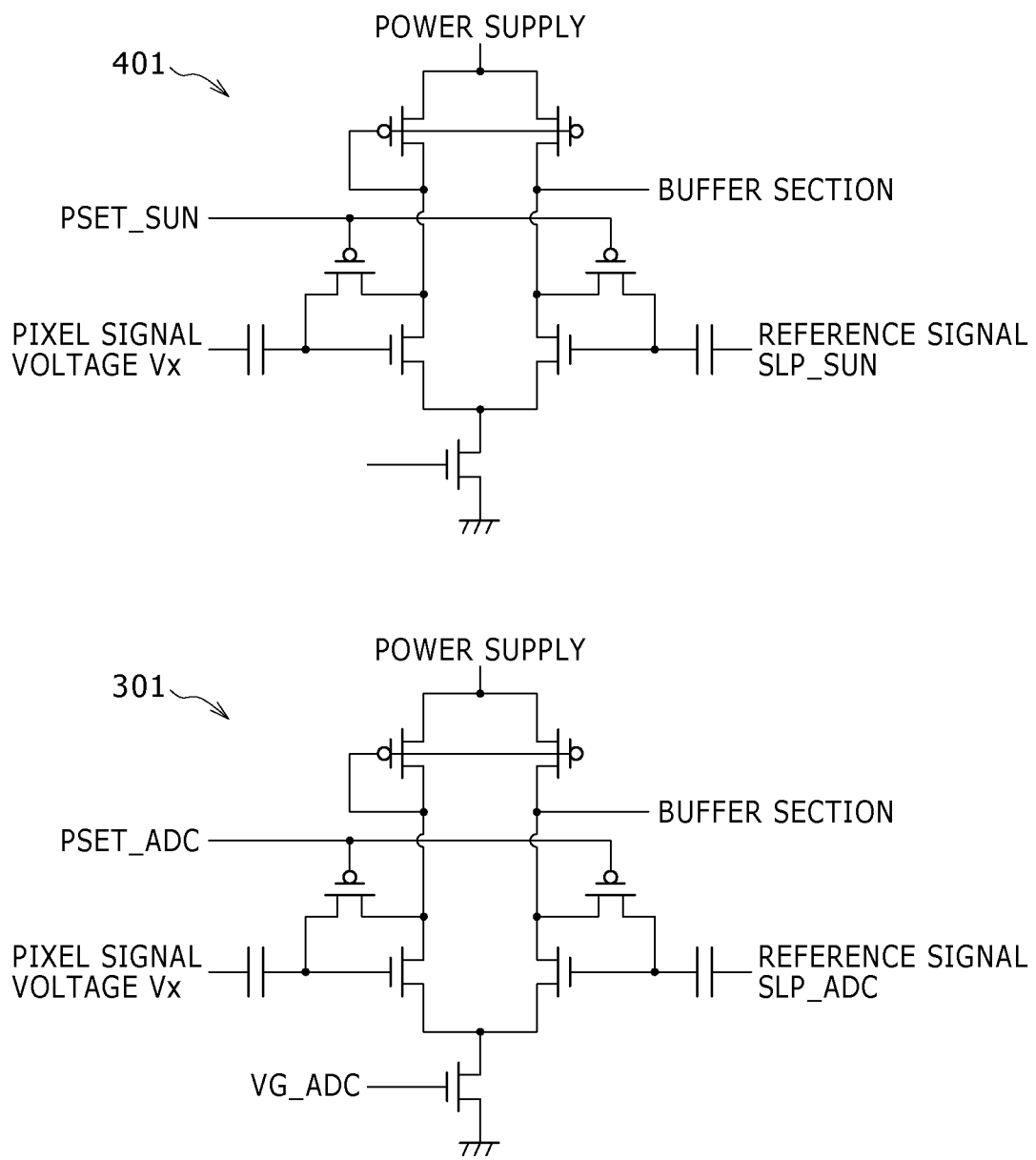
FIG. 11 is a block diagram showing a configuration of two comparison sections in the circuit shown in FIG. 9.

Consequently, a situation that the pixel signal Vx of the column signal line 31 drops suddenly over a period from the AZ period to the reading period of the D phase occurs (Vx1 and Vx2 indicated by broken lines in FIG. 6). If it is tried to use the auto zero process to cope with such a state as just described, then even if a signal component corresponding to the incident light amount of the pixel 11 is read out thereafter, since the voltage of the column signal line 31 varies a little or does not substantially vary, the signal component is outputted as a signal of black or of a color proximate to black, resulting in a tanning phenomenon.

In the following, operation in the case where such extremely excessive incident light as may cause a tanning phenomenon is described continuously with reference to FIG. 6.

If the primitive pixel signal Vx of the column signal line 31 drops in response to excessive incident light within the AZ period, then the dropped voltage of the primitive pixel signal Vx and the voltage of the reference signal Vref are retained into the capacitors C1 and C2 in the comparator output controlling circuit 33, respectively. After the AZ period comes to an end, the latch circuit 331 in the comparator output controlling circuit 33 is activated by the activation signal EN. At this time, the node 333a of the column signal line 331 is put to the voltage corresponding to the potential difference between the potentials retained in the capacitors C1 and C2.

However, if the voltage of the primitive pixel signal Vx drops until it becomes equal to or lower than the voltage of the reference signal Vref of the Vref signal line 66 as described above, then when the latch circuit 331 is activated, the voltage of the node 333a becomes the GND level.

The node 333a of the latch circuit is connected directly to the NAND circuit 335, and the output of the NAND circuit 335 becomes equal to the H (High) level irrespective of the voltage level of the comparison signal Vout of the comparator 32.

Since the latch circuit 331 remains in the activated state until after the readout period comes to an end, also the output of the NAND circuit 335 continues to exhibit the H level within the period. After all, if such extremely excessive incident light as may cause a tanning phenomenon is inputted, then the input signal of the counter 35 does not reverse, and the count value exhibits a value obtained by full counting within a count period for 10 bits prepared to read out signal components, that is, for 1,024 clocks.

In this manner, in the present disclosure, against such a condition that the potential of the floating diffusion fluctuates by a great amount within a zero adjustment period of a ramp signal, a tanning phenomenon can be suppressed with a very simple configuration having a reduced number of components. Further, since the configuration that only a comparison period of the D phase is measured is adopted, the entire solid-state imaging apparatus can be simplified.

While a preferred embodiment of the present disclosure has been described using specific terms, such description is for illustrative purposes, and it is to be understood that changes and variations may be made without departing from the spirit or scope of the following claims.

The present application contains subject matter related to that disclosed in Japanese Priority Patent Application JP 2010-143459 filed in the Japan Patent Office on Jun. 24, 2010, the entire content of which is hereby incorporated by reference.

What is claimed is:

1. A solid-state imaging apparatus, comprising:
a pixel adapted to convert charge obtained by photo-electric conversion by a photoelectric conversion element into a pixel signal having a voltage corresponding to the charge amount and output the pixel signal;
a comparison section adapted to compare the pixel signal outputted from said pixel with a ramp signal which varies with respect to time and output a comparison signal;
a measurement section adapted to start counting in synchronism with the ramp signal to continuously carry out the counting operation until a signal supplied to an input terminal thereof is reversed thereby to measure comparison time; and
a comparator output controlling section interposed between an output terminal of said comparison section and the input terminal of said measurement section and adapted to receive the pixel signal as an input thereto;
said comparator output controlling section being operable, if a value of the pixel signal exceeds a predetermined value determined based on a tanning phenomenon when the counting is started by said measurement section, to stop the counting operation when the comparison signal outputted from said comparison section is supplied to the input terminal of said measurement section to reverse the comparison signal, but
operable, if the value of the pixel signal is not greater than the predetermined value when the counting is started by said measurement section, to supply a signal which is not reversed within a measurement period by said measurement section to the input terminal of said measurement section to continue the counting operation during the measurement period.

2. The solid-state imaging apparatus according to claim 1, wherein
the predetermined value is determined based on a voltage of a reference signal set based on a saturation level of said pixel.

3. The solid-state imaging apparatus according to claim 2, wherein
said comparator output controlling section includes:
a latch circuit configured by connecting two inverters in a loop; and
a NAND circuit connected at one of input terminals thereof to a first node of said latch circuit and at the other one of the input terminals thereof to the output terminal of said comparison section;
a signal line for the pixel signal being connected to the first node while a signal line for the reference signal is connected to a second node of said latch circuit;
said NAND circuit being connected at an output terminal thereof to the input terminal of said measurement section.

4. The solid-state imaging apparatus according to claim 1, wherein
a plurality of such pixels are arrayed in rows and columns to form a pixel array;
said comparison section, measurement section and comparator output controlling section are provided for each of the columns of said pixels to form a conversion section; and
only a data phase are provided within a column scanning period within which said pixels in each of the rows of the pixel array are operated in parallel without providing a pre-charge phase.

* * * * *